Patented Mar. 6, 1923.

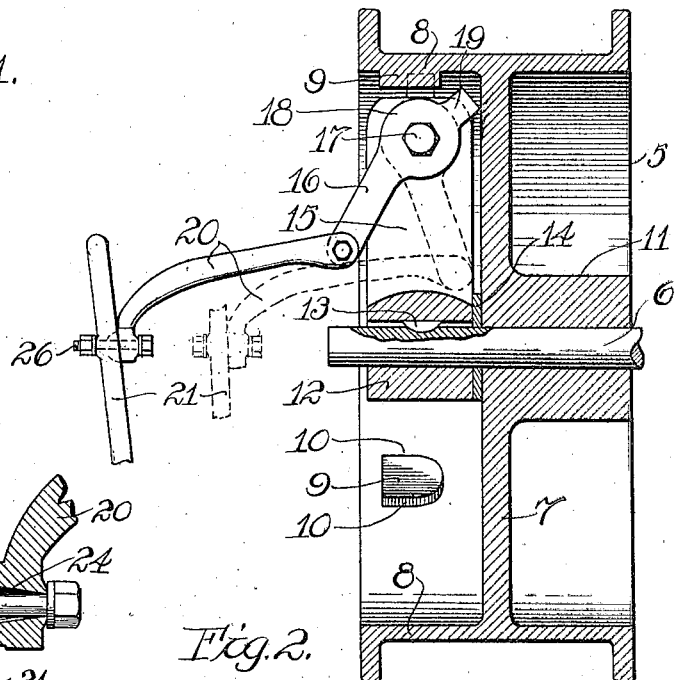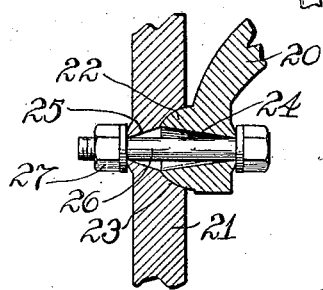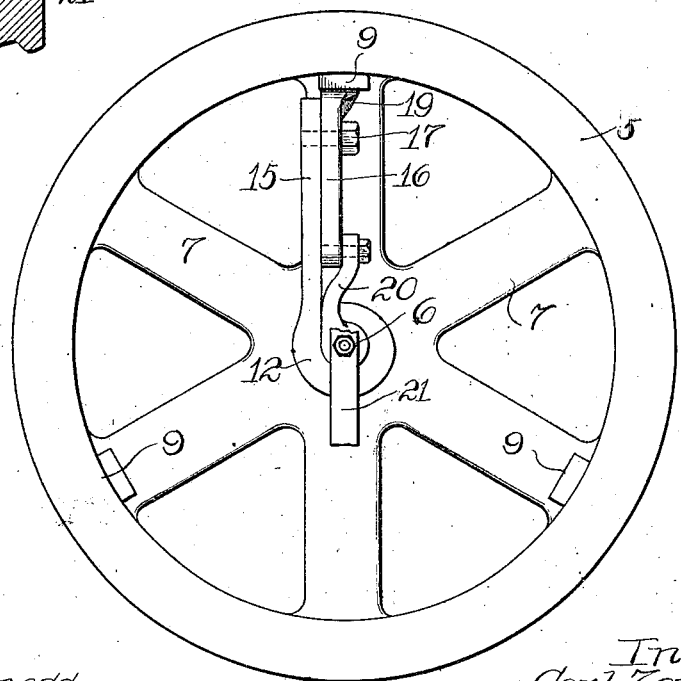

1,447,585

UNITED STATES PATENT OFFICE.

CARL ZETTERLUND, OF CHICAGO, ILLINOIS.

CLUTCH.

Application filed October 17, 1921. Serial No. 508,207.

*To all whom it may concern:*

Be it known that I, CARL ZETTERLUND, a citizen of the United States, and a resident of Chicago, in the county of Cook and State of Illinois, have invented certain new and useful Improvements in a Clutch, of which the following is a specification.

This invention has relation to clutches in general, but particularly to a clutch which is especially designed for use in connection with a drum or pulley having an overhanging flange, and it consists in certain peculiarities of the construction, novel arrangement, combination and cooperation of the parts thereof as will be hereinafter more fully set forth and specifically claimed.

The object of the invention is to provide a clutch of the above mentioned general character, which shall be very simple and inexpensive in construction, strong, durable, efficient and positive in its operation.

In the accompanying drawing which serves to illustrate an embodiment of the invention—

Fig. 1 is a central sectional view through a drum showing it loosely mounted on a shaft and illustrating a clutch embodying my improvements fixedly mounted on said shaft with its parts shown by dotted lines in their operative positions and by continuous lines in their inoperative or unclutched positions.

Fig. 2 is a face view of the drum and clutch looking from the operative lever for the latter, and Fig. 3 is a detail sectional view of portions of the operating lever and connecting link for the clutch, showing the means for connecting said parts.

Like numerals of reference refer to like parts in the views of the drawing.

The reference numeral 5 designates a drum or pulley which is loosely mounted on a shaft 6 and has on at least one of the sides of its spokes 7 an overhanging flange 8 which flange is extended parallel with the axis of the shaft. The flange 8 of the drum or pulley is provided on its inner surface at equidistant points with a plurality of lugs 9 each of which is by preference of the shape shown in Fig. 1, that is to say, has straight side edges or walls 10, which walls are rounded towards each other at that end of the lug adjacent the spokes or web 7 of the drum.

By reference to Fig. 1, it will be seen that the drum 5 is provided with a hub 11 on one side only of the spokes 7, and that the hub 12 of the clutch is mounted on the shaft 6 and fixed thereto preferably by means of a Woodruff key 13 on the other side of said spokes. A washer 14 is by preference interposed between the hub of the drum and the adjacent end of the hub 12 of the clutch and surrounds the shaft as is obvious.

Extended from the hub 12 of the clutch is an arm 15 which terminates at its free end a short distance inwardly from the inner surfaces of the lugs 9 of the drum.

Pivotally mounted near its outer end on one side of the arm 15 near its outer end is a clutch arm 16 which is provided around its pivot 17 with a flat-faced hub 18 to provide an enlarged bearing against the arm 15 in order to prevent wabbling of the clutch arm 16 in the operation of the device. Extended radially from the hub 18 of the clutch arm is a lug engaging arm 19 of such length that when the clutch arm 16 is moved from the position shown by continuous lines to that shown by dotted lines in Fig. 1 of the drawing, its outer end will not contact with the inner surface of the flange 8 of the drum but will contact with one of the straight edged sides of one of the lugs 9 on the flange of the drum. Pivotally connected to the free end of the clutch arm 16 is one end of a link 20 the other end of which is swivelled to an operating lever 21 which may be suitably fulcrumed on a support near the end of the shaft 6, on which the drum and clutch is mounted.

As shown in Fig. 3 of the drawing, that end of the link 20 wihch is connected to the operating lever 21 is provided on its surface adjacent said lever with a semi-spherical enlargement 22 which fits in and co-acts with a similar shaped socket 23 in the adjacent surface of said lever. The link 20 has extended transversely therethrough, as well as through the part 22, a counter-sunk opening 24, or an opening which is flared towards the lever. The lever also has a transverse opening 25 flared towards the opening 24. Connecting the link 20 and lever 21 is a bolt 26 which is extended through said openings and held in position by means of a nut 27 mounted on one of its ends. By this arrangement it is manifest that when the clutch is thrown into engagement with one of the lugs 9 on its flange, the drum 5 will be caused to rotate with the shaft 6 and the clutch.

When it is desired to release the clutch from the drum, it is only necessary to move the lever 21 from the position shown by dotted lines in Fig. 1, to that shown by continuous lines in said figure. As the clutch rotates with the shaft 6 whether in engagement with the drum or not, it is obvious that the link 20 connecting the clutch arm to the operating lever will be carried around the axis of the shaft, and in order to permit this movement without undue interference with the operating lever, the ball and socket or universal joint above described and illustrated in Fig. 3 of the drawing is employed.

By reference to Fig. 1, it will be seen that the lug engaging arm 19 of the clutch is radially disposed with respect to the pivot 17 of the clutch arm 16, while the latter arm is tangentially disposed with respect to said pivot. By this arrangement, when the parts are positioned as shown by dotted lines in Fig. 1, it is evident that the clutch arm 16 will approach one of the spokes and thus cause the lug engaging arm 19 to positively engage one of the lugs on the drum.

Having thus fully described my invention, what I claim as new and desire to secure by Letters Patent is—

1. The combination with a rotatable shaft, of a drum loosely mounted thereon and having an overhanging flange provided on its inner surface with spaced lugs, a supporting arm keyed to said shaft under the flange of the drum, a clutch arm pivotally mounted on the supporting arm near the free end of the latter and having a lug engaging arm at its outer portion, a link pivoted at one of its ends to the clutch arm near its inner end, an operating lever suitably fulcrumed near one end of said shaft, and a universal connection uniting said lever and the outer end of said link.

2. The combination with a rotatable shaft, of a drum loosely mounted thereon and having an overhanging flange provided on its inner surface with spaced lugs, a supporting arm keyed to said shaft under the flange of the drum, a clutch arm pivotally mounted on the supporting arm near the free end of the latter and having a lug engaging arm at its outer portion radially disposed with the pivot of the clutch arm, a link pivoted at one of its ends to the clutch arm near its inner end and having on its opposite end a laterally extended rounded enlargement, an operating lever suitably fulcrumed near one end of said shaft and having a socket in its surface adjacent said link to receive the enlargement thereon, said link and lever having oppositely flared coinciding openings and a bolt extending through said openings and loosely connecting the link and lever.

CARL ZETTERLUND.